(12) United States Patent
Och

(10) Patent No.: US 7,950,425 B2
(45) Date of Patent: May 31, 2011

(54) FILLER NECK TO FILL FUEL INTO A VEHICLE TANK

(75) Inventor: Roland Och, Rottendorf (DE)

(73) Assignee: ITW Automotive Products GmbH & Co KG, Iserlohn, DE (US)

( * ) Notice: Subject to any disclaimer, the term of this patent is extended or adjusted under 35 U.S.C. 154(b) by 681 days.

(21) Appl. No.: 10/597,267

(22) PCT Filed: Jan. 14, 2005

(86) PCT No.: PCT/IB2005/000084
§ 371 (c)(1),
(2), (4) Date: Jun. 18, 2008

(87) PCT Pub. No.: WO2005/077698
PCT Pub. Date: Aug. 25, 2005

(65) Prior Publication Data
US 2008/0237230 A1 Oct. 2, 2008

(30) Foreign Application Priority Data
Jan. 19, 2004 (DE) .......................... 10 2004 002 994
Aug. 5, 2004 (EP) .................................... 04018518

(51) Int. Cl.
*B65B 1/04* (2006.01)
*B65B 3/00* (2006.01)
(52) U.S. Cl. ........................ 141/367; 141/350; 220/86.2
(58) Field of Classification Search .................. 141/350; 220/86.2
See application file for complete search history.

(56) References Cited

U.S. PATENT DOCUMENTS 3,730,216 A * 5/1973 Arnett et al. .................. 137/588
(Continued)

FOREIGN PATENT DOCUMENTS

DE 4039269 C1 2/1992
(Continued)

OTHER PUBLICATIONS

Notice of Reasons for Rejection for Application No. JP2006-548472 issued Jun. 1, 2010.

*Primary Examiner* — Timothy L Maust
(74) *Attorney, Agent, or Firm* — Lowe Hauptman Ham & Berner LLP

(57) ABSTRACT

A filler neck an actuation ring (16) having a slot (18) and an entrance portion which is conically narrowed towards the tank, the most narrow cross-section of the entrance portion being smaller than the diameter of a diesel-nozzle and larger than that of an otto-nozzle the actuation ring (16) has an actuation portion at the end facing the tank at least on one side of the slot a closing mechanism is associated with the end of the actuation ring facing the tank and designed such that in closing position thereof it stops the otto nozzle inserted into the actuation ring and the actuation portion of the actuation ring engages the closing mechanism, whereby the closing mechanism is moved from the closing position into an opened position by the actuation portion if the actuation ring is radially expanded by the diesel-nozzle inserted into the actuation ring.

12 Claims, 6 Drawing Sheets

U.S. PATENT DOCUMENTS

| | | |
|---|---|---|
| 5,056,570 A | 10/1991 | Harris |
| 5,732,840 A | 3/1998 | Foltz |
| 5,884,958 A | 3/1999 | Oddenino |
| 6,302,169 B1 * | 10/2001 | Pulos .......................... 141/301 |
| 6,315,144 B1 | 11/2001 | Foltz |
| RE37,776 E | 7/2002 | Foltz |
| 6,415,827 B1 | 7/2002 | Harris |
| 6,431,228 B2 | 8/2002 | Foltz |
| 6,539,990 B1 | 4/2003 | Levey et al. |
| 6,554,150 B2 | 4/2003 | Foltz |
| 6,679,396 B1 | 1/2004 | Foltz |
| 6,755,057 B2 | 6/2004 | Foltz |
| 6,923,224 B1 | 8/2005 | McClung |
| 6,942,117 B2 | 9/2005 | Foltz |
| 6,968,874 B1 * | 11/2005 | Gabbey et al. .............. 141/349 |
| 6,991,006 B2 | 1/2006 | Gramss |
| 7,063,113 B2 | 6/2006 | Ropert et al. |
| 7,077,178 B2 * | 7/2006 | Hedevang ................... 141/367 |
| 7,128,232 B2 | 10/2006 | Beck |
| 7,293,586 B2 * | 11/2007 | Groom et al. ............... 141/350 |
| 7,302,977 B2 * | 12/2007 | King et al. ................... 141/367 |

FOREIGN PATENT DOCUMENTS

| | | |
|---|---|---|
| DE | 10126207 A1 | 1/2003 |
| DE | 10126209 A1 | 1/2003 |
| DE | 10139665 A1 | 2/2003 |
| EP | 0872370 | 10/1998 |
| EP | 1262355 | 12/2002 |
| EP | 1262357 | 12/2002 |
| EP | 1284212 | 2/2003 |
| FR | 2761934 A | 10/1998 |
| FR | 2762807 A | 11/1998 |
| JP | 2003-182387 | 7/2003 |
| WO | 03/010022 A1 | 2/2003 |

* cited by examiner

FILLER NECK TO FILL FUEL INTO A VEHICLE TANK

RELATED APPLICATIONS

The present application is a National Phase application based on International Application Number PCT/IB2005/000084, filed Jan. 14, 2005, which claims priority from, German Application Number 10 2004 002 994.6, filed Jan. 19, 2004 and European Application Number 04018518.3, filed Aug. 5, 2004, the disclosures of which are hereby incorporated by reference herein in their entirety.

The invention relates to a filler neck to fill fuel into a vehicle tank.

BACKGROUND OF THE INVENTION

It is known to provide nozzles with different diameters for petrol fuel on the one hand and diesel fuel on the other hand. These measures were introduced following the need to differentiate unleaded petrol fuel from leaded fuel. The nozzles for unleaded petrol fuel have a smaller external diameter than the nozzles for leaded fuel and for diesel fuel. Misfueling a diesel vehicle with petrol fuel is however not ruled out if special precautions are not made for this. It is known from DE 101 26 207 to lock a flap which can be pivoted about a transverse axis in the insertion path of the nozzle in the closed state. The locking is formed by a plurality of radially arranged, circumferentially spaced segments which form a conical entrance portion. If a petrol nozzle is inserted the segments remain in their resting position and the nozzle strikes against the locked flap. The diesel nozzle, however, radially displaces the locking segments and thereby unlocks the flap so that the nozzle can open the flap. Misfuelling by handling the petrol nozzle to remove the locking is not ruled out.

In DE 101 39 665 and DE 101 26 209 filler necks for diesel fuel are known which are designed such that when inserting a diesel nozzle a filling valve opens. When inserting an petrol nozzle, however, the valve is either not actuated so that the petrol fuel remains in the front region of the filler neck or the flow is throttled to such an extent that the nozzle automatically cuts out. The nozzles are known to contain a mechanism which closes the valve in the nozzle as soon as a certain back pressure is generated. As a result, the priority is to avoid overfilling the tank.

The known filler necks require a relatively large amount of space to be constructed and are relatively expensive. Furthermore they cannot be used for so-called capless filling systems. By this is understood filling systems which allow the tank to be automatically refuelled. The filler neck is no longer sealed by a specific cap but the nozzle can be directly inserted. In this connection it is known from FR 2761934 to provide a closure cap on the end of a filler neck. It opens inwardly and is provided with a seal which cooperates with a sealing edge in the interior of the pipe. When refueling the flap is pivoted open by the nozzle against the force of a spring. The object of the flap is to prevent contaminants from entering the tank. Opening the flap requires a relatively large amount of force as the spring has to prevent pressurised spray water, for example, from inadvertently opening the flap.

The object of the invention is to produce a filler neck for filling fuel into a vehicle tank which requires very little space for its construction and few components to prevent misfueling and which is also suitable for use in connection with capless filling systems and offers protection against the penetration of undesirable media into the tank.

BRIEF SUMMARY OF THE INVENTION

This object is achieved by the features of claims 1 and 2.

In the invention an actuation ring is provided which consists of a resiliently flexible material and/or is radially inwardly biased by means of a spring and is split via a preferably axially parallel slit. The actuation ring comprises a conically narrowing entrance portion. In the solution according to claim 1 the narrowest cross-section of the entrance portion is smaller than the cross-section of a diesel nozzle and the same or larger than the cross-section of a petrol fuel nozzle. In other words, the diesel nozzle cannot be readily guided through the narrowest cross-section which is possible for the petrol nozzle. The actuation ring comprises an actuation portion on the end facing the tank on at least one face of the slit. The actuation ring is floatingly accommodated in a preferably cup-shaped housing, i.e. it has restricted lateral movement, the external diameter of the actuation ring being smaller in the non-actuated state that the inner dimensions of the housing. A closing mechanism is associated with the end of the actuation ring facing the tank, which according to claim 1 is constructed such that in the closing position it defines a stop for an inserted nozzle. If in the invention an petrol nozzle is inserted, it can readily pass through the actuation ring but strikes against the closing mechanism and can therefore not be inserted further. This can be readily determined by the person wishing to fill up the tank, so that the mistake can be corrected. If the mistake is not noticed, opening the nozzle would lead to an immediate closure of the valve in the nozzle, as a flow blockage is immediately generated due to the closing mechanism. The closing mechanism does not have to seal the through-going opening tightly. Sufficient throttling of the fuel flow is adequate for it to function.

If, however, according to claim 1 a diesel nozzle with a larger diameter is inserted, it causes the actuation ring to expand. Thus the ends of the actuation ring facing the slit are moved apart from one another. This movement can additionally be used to move the normally closed closing mechanism into the open position.

The solution of claim 2 is for the use of the invention on a capless filler neck. The nozzle diameter is in any case larger than the diameter of the narrowest cross-section when the closing mechanism is to open. The closing mechanism has a movable closing element which substantially tightly seals the through-going opening.

A gear system which is necessary to translate the movement of the actuation portion of the actuation ring when a nozzle is inserted, into an opening movement of the closing mechanism, can conceivably be easily produced with the invention. A beneficial embodiment of this is described in further detail below. As the actuation ring is floatingly mounted, when a nozzle with a smaller external diameter is inserted, the ring is not expanded but lets the nozzle readily pass. The closing mechanism then remains in the closed position.

The closing mechanism is preferably constructed such that the through-passage to the tank is substantially tightly closed. As a result the filler neck according to the invention acts as a protection against the penetration of dust, foreign bodies, dirty water, etc when a closure cap is not provided.

In a particular embodiment of the invention it is provided that the conical entrance portion in the actuation ring is formed from radially circumferentially spaced ribs or segments. The ribs or segments prevent the actuation ring from expanding due, for example, to pressurised spray water. The actuation ring can be integrally formed from plastics which embodies sufficient resilient properties. Alternatively or additionally an annular spring can surround the actuation ring which radially inwardly biases the actuation ring.

In a further embodiment of the invention it is provided that the closing mechanism comprises closing flap to which a lateral arm is connected which is rotatably mounted about an axis and which extends approximately parallel to the axis of the cup-shaped housing. The arm comprises a slot into which the first actuation portion of the actuation ring engages, whilst a second actuation portion is restrictedly movably arranged in a slightly larger fixed recess.

According to a further embodiment of the invention the actuation portions comprise pins, one pin engaging in a slot of the closing flap and the other pin in a hole of a support portion. The support portion bearing the closing flap can be formed from a stationary fastened support disc which comprises a through-going hole for filling the tank which is approximately coaxial to the closing flap in the closed position. The support disc further comprises an arcuate slot through which a fastening pin is guided to engage in the slot of the arm of the closing flap.

The embodiment according to the invention of a fuel filler neck is also suitable for capless filler necks, as on the one hand protection is available against misfuelling and on the other hand sufficient protection is ensured by the closing flap against the penetration of foreign bodies, contaminants, etc into the vehicle tank.

In a further embodiment of the invention the closing mechanism comprises a closing flap which is rotatably mounted about an axis which is transverse to the axis of the actuation ring. It is preferably mounted on the actuation ring itself and in the region of the slit comprises an actuation portion which grips over a radial shoulder or projection of the closing flap, when it is in the closing position. A spring biases the closing flap into this closing position. When opening the closing mechanism via a nozzle, the flap similarly has to be pivoted open against a spring preload, the spring preload can however be kept very low. It must be sufficient to displace the closing flap into the closing position. It does not have to withstand larger forces, for example pressurised spray water, as in the closing position the flap is locked via the actuation portion of the actuation ring.

The invention will be described in further detail below with reference to the drawings, in which:

DETAILED DESCRIPTION OF THE INVENTION

Figure 2:
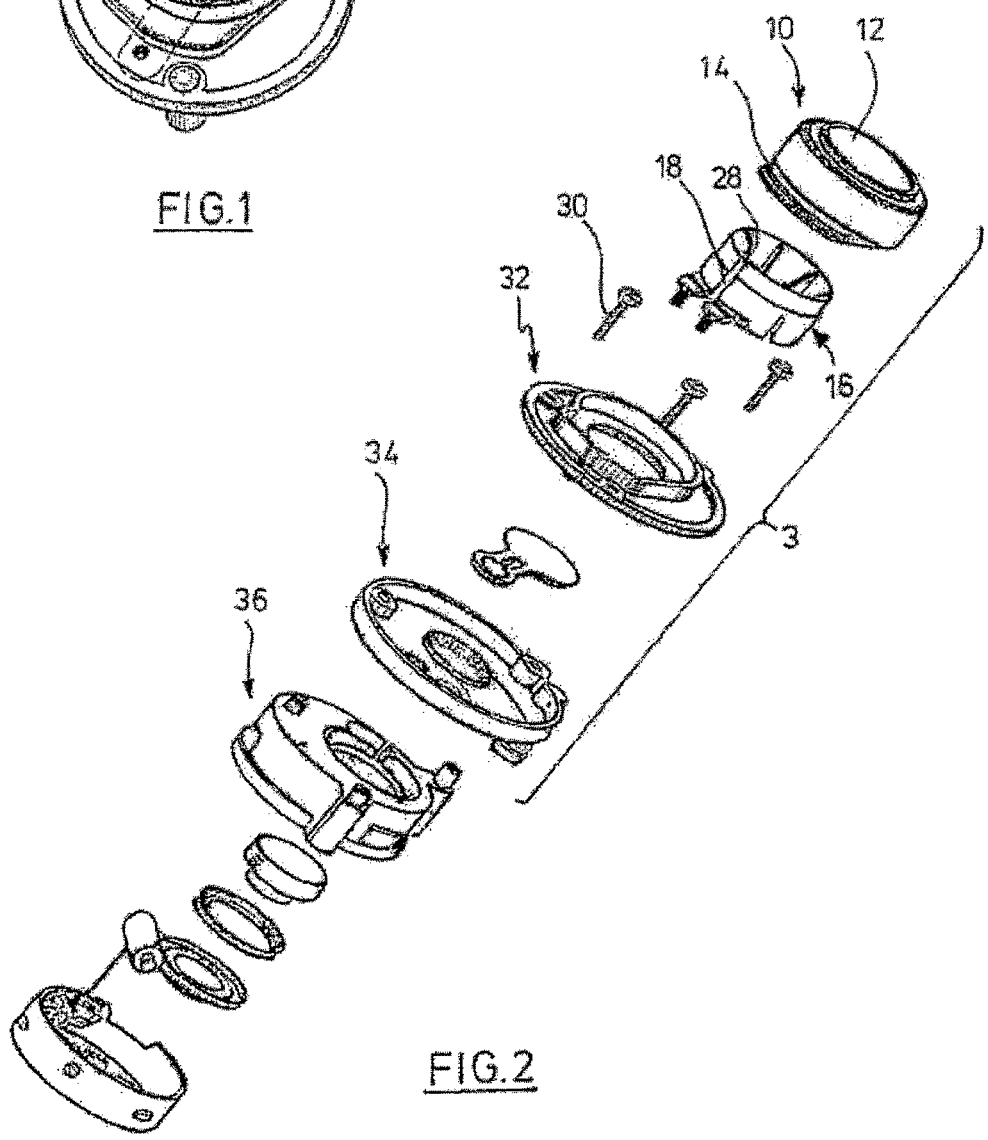
FIG. 2 is an exploded view of the tank filler neck according to FIG. 1.
Figure 3:
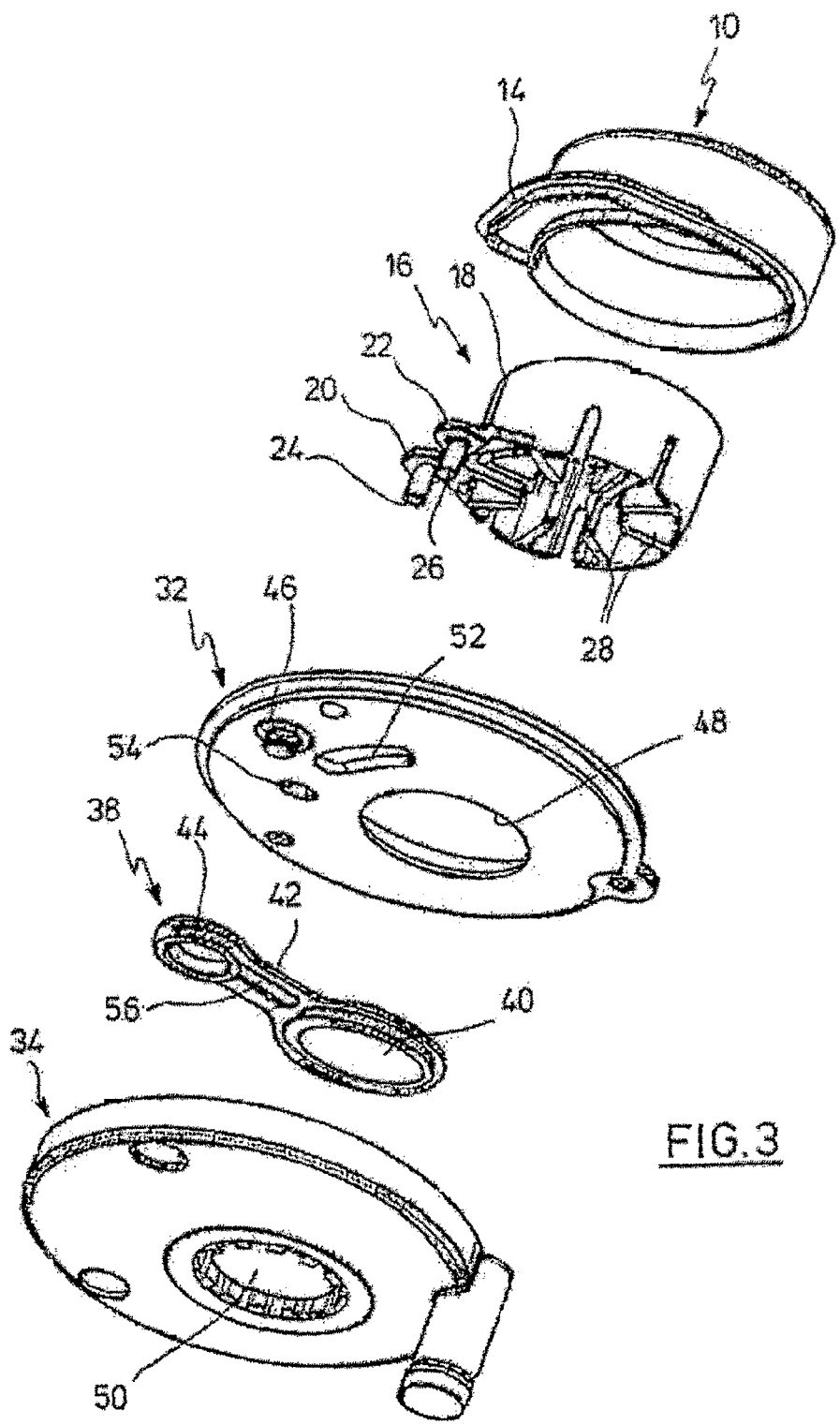
FIG. 3 is the part 3 of the exploded view according to FIG. 2.

In FIGS. 2 and 3 a cup-shaped housing 10 is shown with an entrance aperture 12 at one end and a lateral shoulder 14 at the other end. The other end faces the tank, not shown, of a motor vehicle. Below the cup-shaped housing 10 an actuation ring 16 is shown which is split at 18. In FIGS. 2 and 3 on each face of the slit 18 at the lower end, a segment 20 or 22 is respectively formed which protrudes approximately radially and which respectively comprises a pin 24 or 26 on the lower face. The pins 24, 26 extend axially parallel.

In the interior of the actuation ring a plurality of radial ribs 28 is provided which are circumferentially spaced at regular intervals. The ribs form an entrance portion which tapers away from the cap-shaped housing 10. The actuation ring 16 is inserted into the cap-shaped housing 10. In the non-actuated state the external diameter of the actuation ring 16 is markedly smaller than the internal diameter of the cup-shaped housing 10.

With the aid of three screws 30 a support ring 32 is screwed to a counter ring 34, at the same time it is screwed to a housing 36, which comprises a capless filling system, not shown, which will not be described in further detail. Such a system was already described in detail above with reference to a French publication. It allows the introduction of a nozzle by opening a closing flap automatically, where the nozzle opens the closing flap and clears the way for the fuel. This part is shown in FIG. 2 at the left of the 3 group. However it is not to be described in detail.

By connecting the discs 32, 34 to the housing 36, these parts are also fixedly attached in a suitable manner to the bodywork of the motor vehicle, which is not shown in detail. A closing flap 38 is shown between the discs 32, 34. It comprises an approximately circular closing plate 40, a radial arm 42 and a bearing eye 44. The bearing eye cooperates with an axially parallel pin 46 on the face of the support disc 32 facing the closing flap 38. The support disc has a through-going hole 48 which is arranged approximately axially to the aperture 12 and is also coaxial to an aperture 50 in the disc 34.

In the support disc 32 an arcuate slot 52 is formed through which the pin 26 extends. An approximately radial elongate hole 54 receives the second pin 24. The pin 26 engages in a radial elongate slot 56 of the arm 42.

Figure 4:
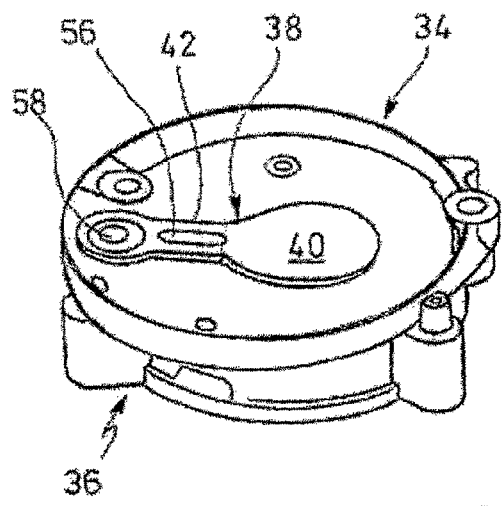
FIG. 4 is a perspective view of a part of the filler neck according to the invention with a closing flap.

In FIG. 4 the disc 34 can be seen which can be connected to the housing 36 by the screw connection (not shown). Moreover the closing plate 40 is visible which closes the through-going hole 50 (FIG. 3), the bearing eye 44 cooperating with an axially parallel pin 58 of the disc 34. The pin 58 is hollow to receive the pin 46 of the support disc 32.

Figure 1:
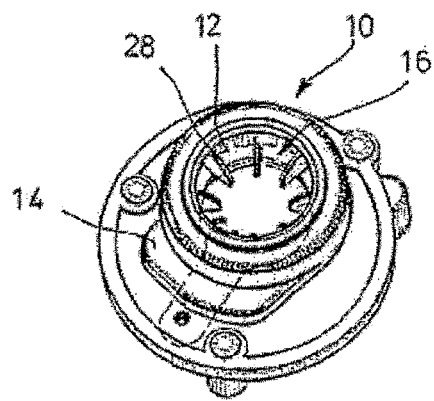
FIG. 1 is an angled perspective view from above of the front part of a filler neck according to the invention.
Figure 5:
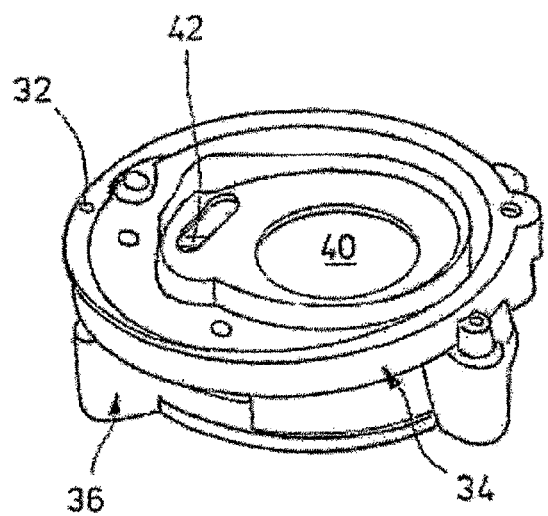
FIG. 5 is a similar view to FIG. 4 but with the addition of the support disc attached on the view according to FIG. 4.
Figure 6:
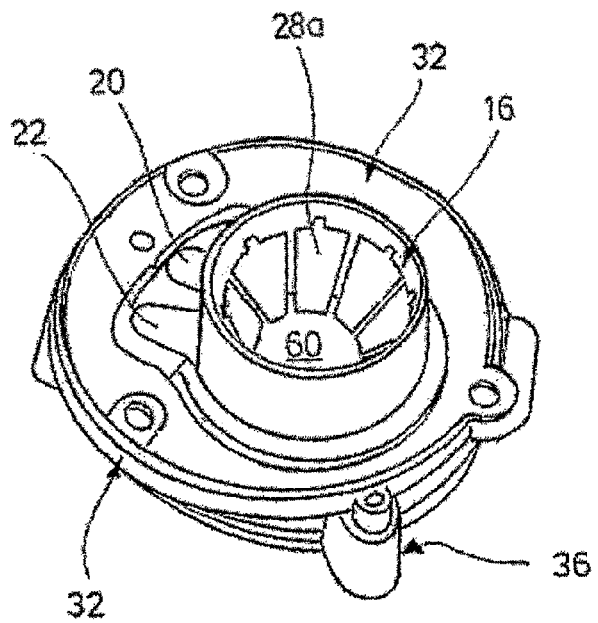
FIG. 6 is an amplification of the part according to FIG. 5 with an actuation ring.
Figure 8:
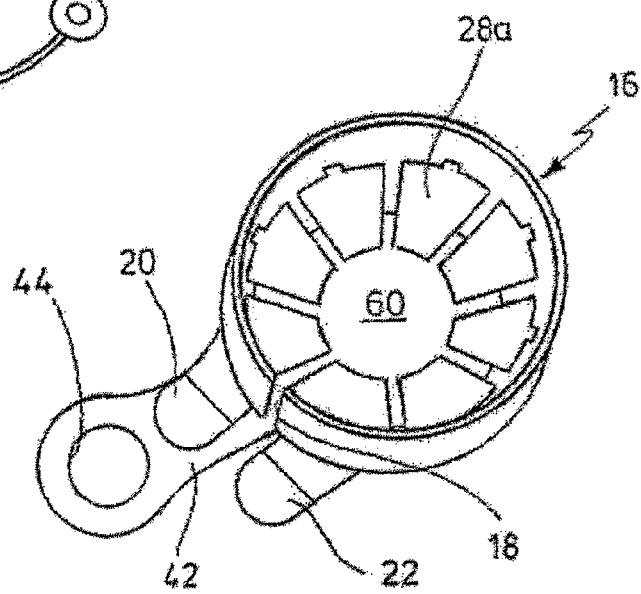
FIG. 8 is an enlarged perspective top view of the actuation ring according to FIG. 6 with the closing flap located therebelow.
Figure 9:
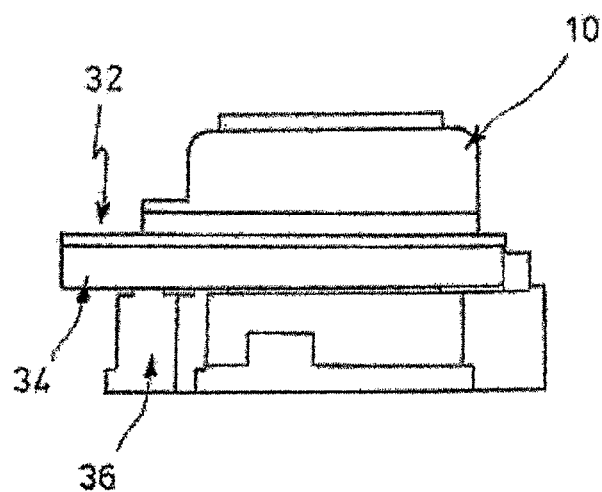
FIG. 9 is a side view of the entire filler neck according to the invention.

In FIG. 5 it is shown how the support disc 32 is assembled with the disc 34 and the closing flap 38. In FIG. 6 it is shown how additionally the actuation ring 16 is placed on the support disc 32. In contrast to the view according to FIGS. 1 to 3, the actuation ring 16 has no ribs but sector-shaped segments 28a which together form an entrance portion tapering toward the tank. This is slightly more clearly shown in FIG. 8. The narrow cross-section is indicated by 60. The diameter of the narrow cross-section is slightly larger than the diameter for the petrol nozzle, however markedly smaller than the diameter for the diesel nozzle. If therefore a diesel nozzle is inserted into the actuation ring, it has to widen the actuation ring 16 in order to be driven further. As a result the slit 18 is enlarged and the segments 20, 22 are moved apart from one another.

Figure 7:
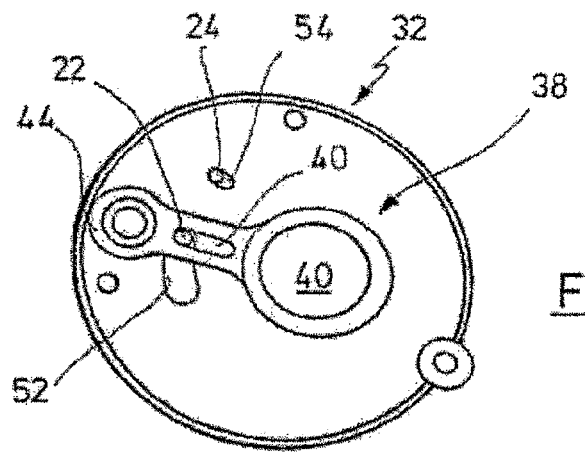
FIG. 7 is a view of the rear face of the support ring according to FIG. 5 with the closing flap.

In FIG. 7 the face facing the tank of the support disc 32 with the closing flap 38 is shown. It can be seen how the actuation pin 26 extends through the arcuate slot 52 of the support disc 32 in engagement with the slot 56. The second pin 24 is located in the elongate slot 54. Moving the pins 24, 26 apart therefore leads to a clockwise pivoting of the closing flap 38, whereby the through-going hole 48 of the support disc 32 is opened. As a result the nozzle can be further guided forward in the direction of the tank to actuate the filling system which is located in the housing 36.

As previously mentioned the parts 32, 34 and the housing 36 are screwed to one another via the screws 30. The attachment of the housing 36 to the bodywork is not shown in detail. The attachment of the cup-shaped housing 10, which receives the actuation ring 16 on the support disc 32 is not shown. In this case a screw fixing, adhesive fixing or the like can also be carried out.

Like the actuation ring 16 the remaining parts of the filling system shown can be produced from a suitable plastics material.

If an arrangement according to part 3 in FIG. 2 is used without the further system, it forms a filler neck with a cap (not shown) which forms a protection for diesel engines against misfuelling with petrol fuel. If on the other hand the complete system of FIG. 2 is used, a capless filler neck is produced, without protection against misfuelling being required, for example when used for petrol engines.

Figure 10:
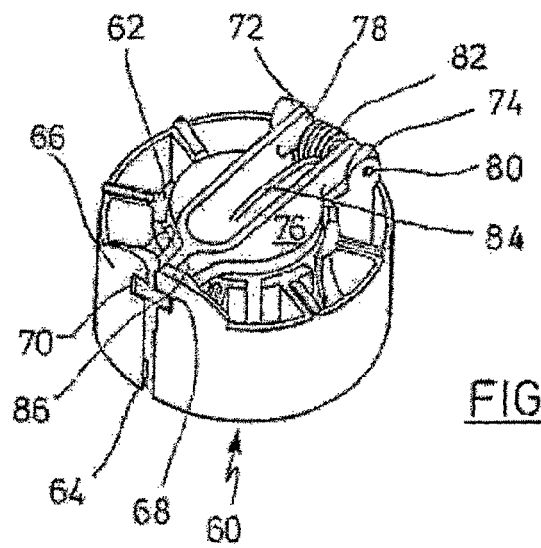
FIG. 10 is a perspective view of an actuation ring of a further embodiment according to the invention.
Figure 11:
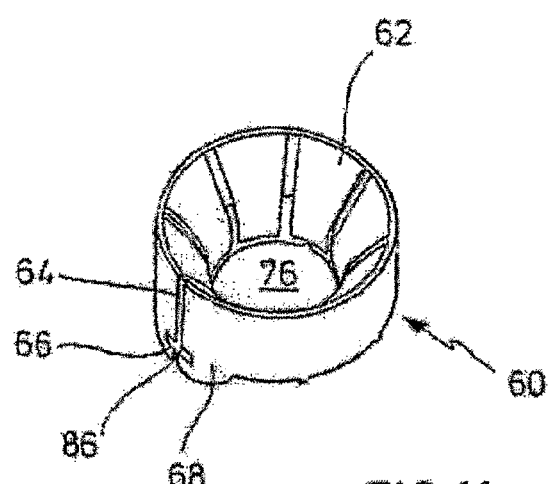
FIG. 11 is an underside view of the view according to FIG. 10.

In FIGS. 10 to 15 a further embodiment of a filler neck for filling with diesel fuel is shown. In FIGS. 10 and 11 an actuation ring 60 can be seen which is similarly constructed to the actuation ring 16 according to the preceding Figures. On the inner face it comprises a row of segments 62 spaced apart by a slot which in FIG. 11 form an entrance portion tapering from top to bottom for a fuel nozzle not shown. The actuation ring 60 is split by an axially parallel slit 64 and on each face of the slit 64 the ring comprises axially parallel shoulders 66, 68 which have opposing notches. In FIG. 10 a notch is referred to by 70.

On the face opposing the slit 64 the actuation ring 60 comprises two circumferentially spaced bearing shoulders 72, 74. A closing flap 76 is provided with a fork-shaped radial shoulder 76 which is rotatably mounted with the aid of a bearing pin 80 in the bearing shoulders 72, 74. Within the fork-shaped shoulder 78 a coil spring 82 is located with an extended arm 84 at one end which rests against the upper face of the closing flap 76. As a result the closing flap 76 is biased in the closing position.

Opposite the fork-shaped shoulder 78 a radial projection 86 is formed on the closing flap 76. It engages laterally in the opposing notches 70 of the shoulders 66, 68. As a result the closing flap 76 is locked in the closing position shown in FIG. 10.

Figure 12:
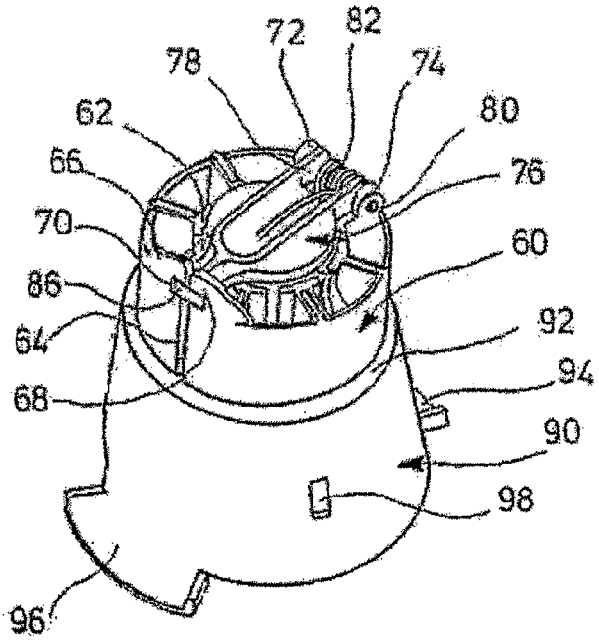
FIG. 12 is the actuation ring according to FIGS. 10 and 11 in connection with a housing insert.
Figure 13:
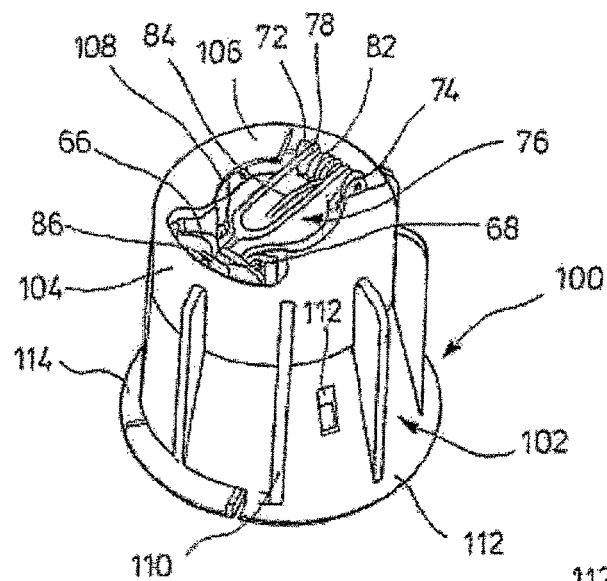
FIG. 13 is a perspective view of an external cup-shaped housing which is pushed over the arrangement according to FIG. 12.

In FIG. 12 a conical annular body or insert 90 is shown which in FIG. 12 flares out from top to bottom. The actuation ring 60 is placed on the upwardly facing front face 92. On the opposing end the conical insert 90 comprises two radial flanges 94, 96. Furthermore the conical insert 90 comprises latching lugs 98 spaced apart on its outer face. In FIG. 13 a cup-shaped housing 100 is shown which comprises a lower conical housing part 102 and a cylindrical housing part 104 added above thereto. The housing part 104 is provided with a base 106 which comprises a through-hole 108 through which the actuation ring 60 can be seen with the closing flap 76. The cup-shaped housing 100 is provided on the exterior with circumferentially spaced reinforcement ribs 110 and at the lower end with two diametrically opposing flanges 112, 114 formed on the lower end in FIG. 13. In the conical housing part 102 locking apertures 112 are moreover seen.

Figure 14:
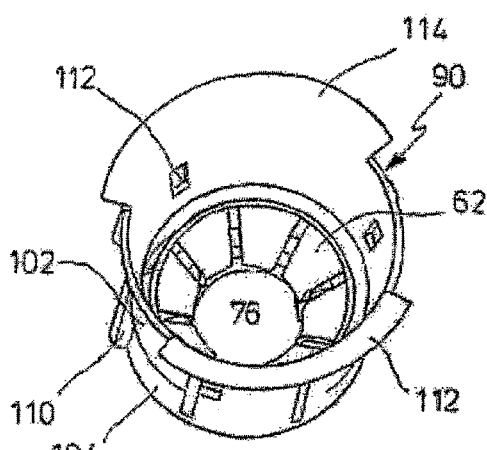
FIG. 14 is an underside view of the view according to FIG. 12.
Figure 15:
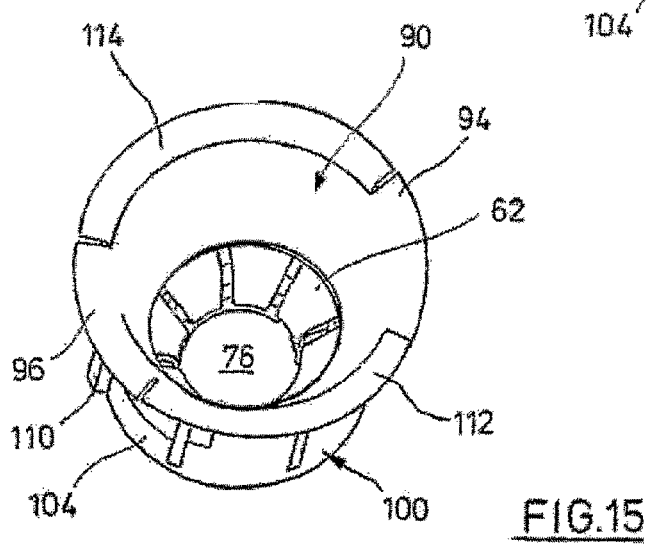
FIG. 15 is an underside view of the view according to FIG. 13.

The actuation ring 60 is positioned from the inside against the base 106 of the housing 100, as is seen in FIG. 14, between the exterior of the ring 60 and the inner face of the housing part 104 there being space so that the actuation ring can restrictedly but freely move laterally within the housing part 104. In the assembly the conical insert 90 is subsequently inserted into the housing 100, the external dimensions of the conical insert 90 corresponding approximately to the internal dimensions of the housing part 102 and the latching lugs 98 engaging in the locking apertures 112 as is shown in FIG. 13. As is seen in FIG. 15, the flanges 94, 96 of the conical insert 90 engage in the gaps of the flanges 112, 114 almost exactly, so that a complete circle is produced. The insert 90 is therefore fastened in the housing 100 and in turn axially secures the actuation ring 60 in the housing 100. The actuation ring can, however, as mentioned above, move with restricted radial movement.

If a petrol fuel nozzle is inserted into the arrangement according to FIGS. 13 and 15, the segments 62 remain without radial impingement. The closing flap 76 thus remains in the closing position shown in the Figures and it is not possible for the operator to insert the nozzle further. If, on the other hand, the diesel fuel nozzle of larger diameter is inserted, the actuation ring 60 is expanded and to such an extent that the closing position of the closing flap 76 shown in the Figures can be relinquished, as with the aid of the nozzle the closing flap 76 is pivoted open. At this point the filling process can begin. If the nozzle is withdrawn again, the flap immediately returns to the closing position shown in the Figures and the actuation ring 60 closes up again to lock the closing flap 76 again in the closing position.

The invention claimed is:

1. A fuel pipe to fill diesel fuel into a vehicle tank, the fuel pipe including the following features:
   a slotted actuation ring of resilient material or being provided with a radially inwardly directed bias, respectively, the actuation ring having a slot and an entrance portion which is conically narrowed towards the tank, the most narrow cross-section of the entrance portion being smaller than the diameter of a diesel-nozzle and larger than that of an otto-nozzle
   the actuation ring has an actuation portion at the end facing the tank at least on one side of the slot
   the actuation ring is floatingly accommodated by a housing, the outer diameter of the actuation ring in the non-actuated state being smaller than the inner dimensions of the housing
   a closing mechanism is associated with the end of the actuation ring facing the tank and designed such that in a closing position thereof it defines a stop for the otto nozzle inserted into the actuation ring and
   the actuation portion of the actuation ring engages the closing mechanism, whereby the closing mechanism is moved from the closing position into an opened position by the actuation portion if the actuation ring is radially expanded by the diesel-nozzle inserted into the actuation ring.

2. The fuel pipe of claim 1, wherein the closing mechanism in its closing position approximately sealingly closes a passage to the tank.

3. The fuel pipe of claim 1, wherein the conical entrance portion includes radially circumferentially spaced ribs or segments.

4. The fuel pipe of claim 1, wherein the closing mechanism includes a closing flap having a lateral arm, the arm being pivotally supported to rotate about an axis parallel to the axis of the cup shaped housing, the arm having a slot which is engaged by the actuation portion of the actuation ring while a second actuation portion of the actuation ring is approximately stationarily located.

5. The fuel pipe of claim 4, wherein the actuation portions having a pair of pins, one pin engaging a slot of the closing flap and the other pin engaging a hole of a support portion which supports the closing flap, the hole allowing restricted movement of the other pin.

6. The fuel pipe of claim 5, wherein the support portion is a stationary support disk which has a through going hole, the disk being located between the closing flap and the actuation ring and having an arcuate slot, one pin is extended through the slot towards the arm of the closing flap.

7. The fuel pipe of claim 5, wherein the hole is also elongated and approximately radially extended.

8. The fuel pipe according to claim 1, characterized in that the closing mechanism includes a closing flap which is supported by the housing for rotation about an axis transverse to the axis of the actuation ring, the flap being biased towards the closing position by spring means, the closing flap including a lateral projection, at least one actuation portion of the actuation ring being designed such that it overgrips the projection if the closing flap is in its closing position and in that the actuation portion releases projection if the actuation ring is expanded by the fuel nozzle.

9. The fuel pipe of claim 8, wherein the closing flap being supported on the side of the actuation ring opposite to slot.

10. The fuel pipe of claim 1, wherein a cup shaped housing is provided having a bottom with a through-going opening which is closed by the closing mechanism in the closing position thereof, the actuation ring engaging bottom of the cup shaped housing, wherein further an annular insert is provided which approximately matching the interior of the cup shaped housing and being attached thereto, with the inner end of the annular insert engaging the facing front surface of the actuation ring.

11. The fuel pipe of claim 1, wherein the cup shaped housing and the annular insert are formed of plastic material, the annular insert having outer locking projections which cooperate with complementary locking openings of the cup shaped housing in order to secure the annular insert to the cup shaped housing.

12. A fuel pipe to fill fuel into a vehicle tank by a fuel-nozzle, the fuel pipe having the following features:
  a slotted actuation ring of resilient material or being provided with a radially inwardly directed bias, respectively, the actuation ring having a slot and an entrance portion which is conically narrowed towards the tank, the most narrow cross-section of entrance portion being smaller than the cross-section of a fuel-nozzle
  the actuation ring has an actuation portion at the end facing the tank at least on one side of slot
  the actuation ring is floatingly accommodated by a housing, the outer diameter of the actuation ring in the a non-actuated state being smaller than the inner diameter of the housing
  a closing mechanism is associated with the end of actuation ring facing the tank, the closing mechanism having a closing element which is movably supported for movement in order to an approximately sealingly closing the passage to the tank
  the actuation portion of the actuation ring engages the closing mechanism, whereby the closing mechanism is moved from the closing into the opened position when the fuel-nozzle radially expands the actuation ring and displaces the actuation portion.

* * * * *